(12) United States Patent
Mallik

(10) Patent No.: US 10,181,910 B2
(45) Date of Patent: Jan. 15, 2019

(54) DATA TRANSFER USING MOBILE DEVICES

(71) Applicant: UBONA TECHNOLOGIES PVT. LTD, Bangalore (IN)

(72) Inventor: Manas Kumar Mallik, Bangalore (IN)

(73) Assignee: UBONA TECHNOLOGIES PVT. LTD, Bangalore (IN)

( * ) Notice: Subject to any disclaimer, the term of this patent is extended or adjusted under 35 U.S.C. 154(b) by 347 days.

(21) Appl. No.: 14/228,233

(22) Filed: Mar. 27, 2014

(65) Prior Publication Data
US 2015/0310868 A1 Oct. 29, 2015

(30) Foreign Application Priority Data
Jan. 27, 2014 (IN) .............................. 335/CHE/2014

(51) Int. Cl.
*H04B 11/00* (2006.01)
(52) U.S. Cl.
CPC ................................... *H04B 11/00* (2013.01)
(58) Field of Classification Search
CPC ..................................................... H04B 11/00
USPC ......................................................... 367/135
See application file for complete search history.

(56) References Cited

U.S. PATENT DOCUMENTS

| | | | |
|---|---|---|---|
| 2009/0249407 A1* | 10/2009 | Manne | H04N 21/6181 725/68 |
| 2012/0084131 A1* | 4/2012 | Bergel | G06F 17/30876 705/14.26 |
| 2012/0179525 A1* | 7/2012 | Seguin | G06Q 30/0207 705/14.16 |
| 2012/0205433 A1* | 8/2012 | Dudek | G06Q 20/209 235/375 |
| 2013/0050080 A1* | 2/2013 | Dahl | G01S 5/18 345/158 |
| 2013/0171930 A1* | 7/2013 | Anand | H04B 5/0031 455/41.1 |
| 2014/0129231 A1* | 5/2014 | Herring | G10L 25/51 704/270.1 |
| 2014/0201069 A1* | 7/2014 | Arentz | H04B 11/00 705/39 |

* cited by examiner

*Primary Examiner* — Hovhannes Baghdasaryan
(74) *Attorney, Agent, or Firm* — Symbus Law Group, LLC; Clifford D. Hyra

(57) ABSTRACT

The present invention provides a method and system for transmitting data. The system includes an encoder for converting the data into one or more binary sequences using a binary encoding scheme, selecting one or more sets of frequencies from a frequency matrix based on the one or more binary sequences, and prepending a starter frequency to the one or more sets of frequencies. The system further includes an audio generator for generating one or more audio signals based on the one or more sets of frequencies, a storage module and an output module having one or more an electro acoustic transducers for generating an acoustic output based on the one or more audio signals.

5 Claims, 4 Drawing Sheets

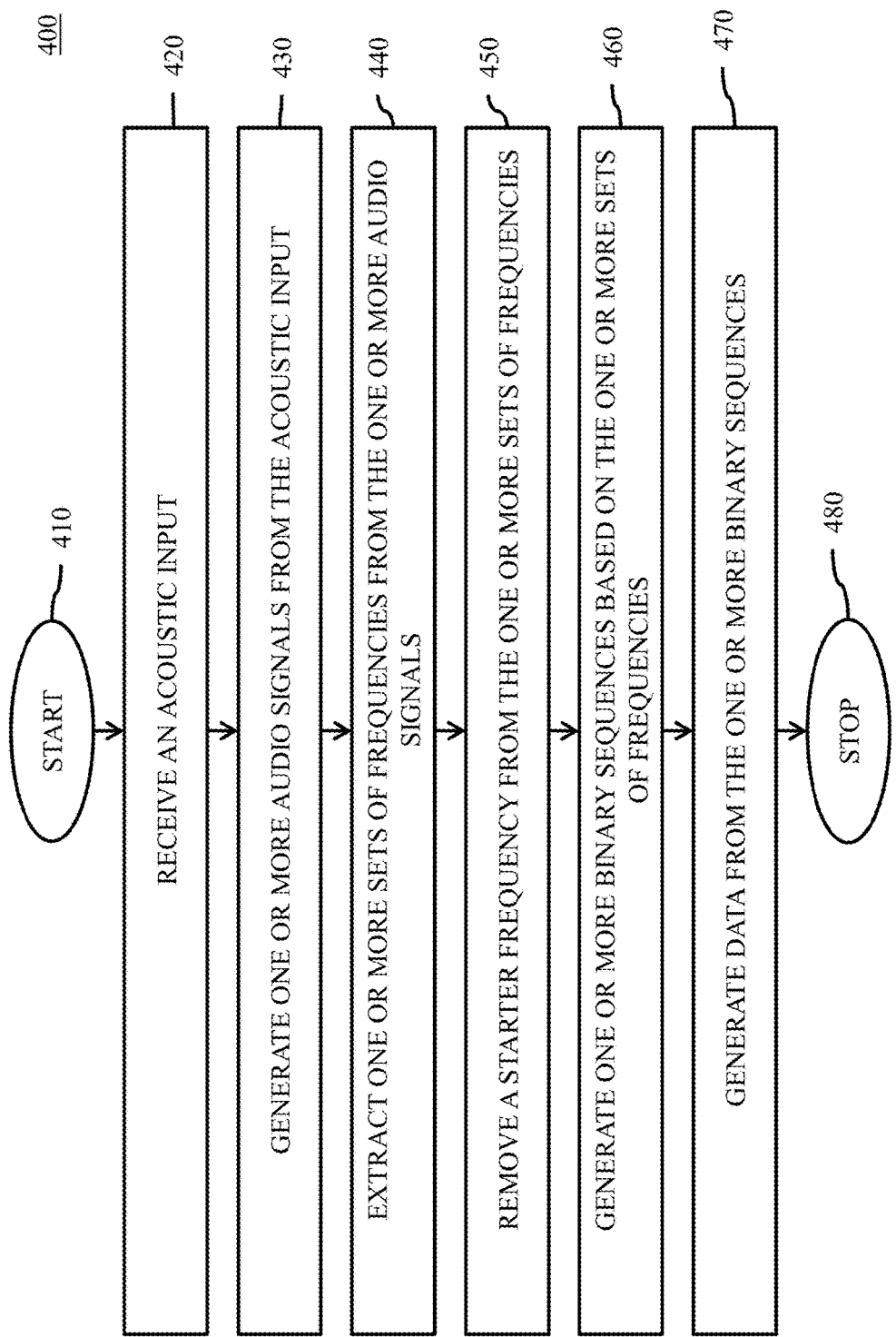

DATA TRANSFER USING MOBILE DEVICES

FIELD OF INVENTION

This application claims the benefit of Indian Patent Application Serial No. 335/CHE/2014 filed Jan. 27, 2014, the entirety of which is herein incorporated by reference.

The present invention relates to data transfer using mobile devices and in particular, it relates to audio based data transfer among mobile devices.

BACKGROUND

The extensive proliferation of mobile devices allows one to stay connected and constantly receive data. However in today's social world, numerous situations arise where people in close proximity wish to exchange information with their electronic devices but may not be able to because they lack each other's contact information. Such peer to peer transfer of data on ad hoc channel using mobiles devices is still a venue that has not matured sufficiently. Currently, one can use wireless technologies such as Bluetooth or Radio Frequency Identification (RFID) or Near Field Communication (NFC) to achieve the data transfer. However, all of the above mentioned technologies require use of special hardware and therefore expensive. Moreover, older mobile devices may not have required hardware component and therefore not be able to participate in data transfer.

There have been several approaches to over the above mentioned issue of peer to peer data transfer. One such approach relates to the usage of voice channel of a wireless telephone network to transmit data (See US 20090249407 A1, Mane et. al.). Data from a client device is modulated into an audio signal and transmitted to a wireless telephone, which then places a call to a remote device over the wireless network. During the phone call, the wireless telephone transmits the audio signal across the voice channel of the wireless telephone network to the remote device. However, since the above mentioned approach relies on the wireless telephone network, the approach would fail in situations where the wireless telephone network is unavailable.

Another approach relates to the usage of ultrasonic audio signals to transmit data (See US 20130171930 A1, Anand et. al.). In this approach, data is transmitted over an audio signal having ultrasonic frequency bands of 20. This approach suffers from high error rates, since mobile devices, which were ideally meant to operate in human hearing range (20 Hz to 20,000 Hz), are not equipped to transmit and receive ultrasonic frequencies properly.

In light of the above discussion, there is a need for a method and system which overcomes all the above stated problems.

BRIEF DESCRIPTION OF THE INVENTION

The above-mentioned shortcomings, disadvantages and problems are addressed herein which will be understood by reading and understanding the following specification.

In embodiments, the present invention provides a system for transmitting data. The system includes an encoder for converting the data into one or more binary sequences using a binary encoding scheme, selecting one or more sets of frequencies from a frequency matrix based on the one or more binary sequences, and prepending a starter frequency to the one or more sets of frequencies. The system further includes an audio generator for generating one or more audio signals based on the one or more sets of frequencies, a storage module and an output module having one or more an electro acoustic transducers for generating an acoustic output based on the one or more audio signals.

In an embodiment, the system further includes an input module having a microphone for receiving an acoustic input, a frequency extractor for extracting one or more sets of frequencies from the acoustic input using a Fast Fourier Transform technique, and a decoder. The decoder is configured to remove the starter frequency from the one or more sets of frequencies, generate the one or more binary sequences based on the one or more sets of frequencies, and generate the data from the one or more binary sequences based on a binary decoding scheme.

In another aspect, the present invention provides a method of transmitting data. The method includes converting the data into one or more binary sequences using a binary encoding scheme, selecting one or more sets of frequencies from a frequency matrix based on the one or more binary sequences, prepending a starter frequency to the one or more sets of frequencies, generating one or more audio signals based on the one or more sets of frequencies, and generating an acoustic output based on the one or more audio signals.

In yet another aspect, the present invention provides a method of receiving data. The method includes receiving an acoustic input, generating one or more audio signals from the acoustic input, extracting one or more sets of frequencies from the one or more acoustic signals using a Fast Fourier Transform technique, removing a starter frequency from the one or more sets of frequencies; generating one or more binary sequences based on the one or more sets of frequencies, and generating the data from the one or more binary sequences based on a binary decoding scheme.

Systems and methods of varying scope are described herein. In addition to the aspects and advantages described in this summary, further aspects and advantages will become apparent by reference to the drawings and with reference to the detailed description that follows.

BRIEF DESCRIPTION OF THE DRAWINGS

FIG. 4 illustrates flowchart for receiving data by a mobile device, in accordance with various embodiments of the present invention.

DETAILED DESCRIPTION OF THE INVENTION

In the following detailed description, reference is made to the accompanying drawings that form a part hereof, and in which is shown by way of illustration specific embodiments, which may be practiced. These embodiments are described in sufficient detail to enable those skilled in the art to practice the embodiments, and it is to be understood that other embodiments may be utilized and that logical, mechanical, electrical and other changes may be made without departing from the scope of the embodiments. The following detailed description is, therefore, not to be taken in a limiting sense.

Figure 1:
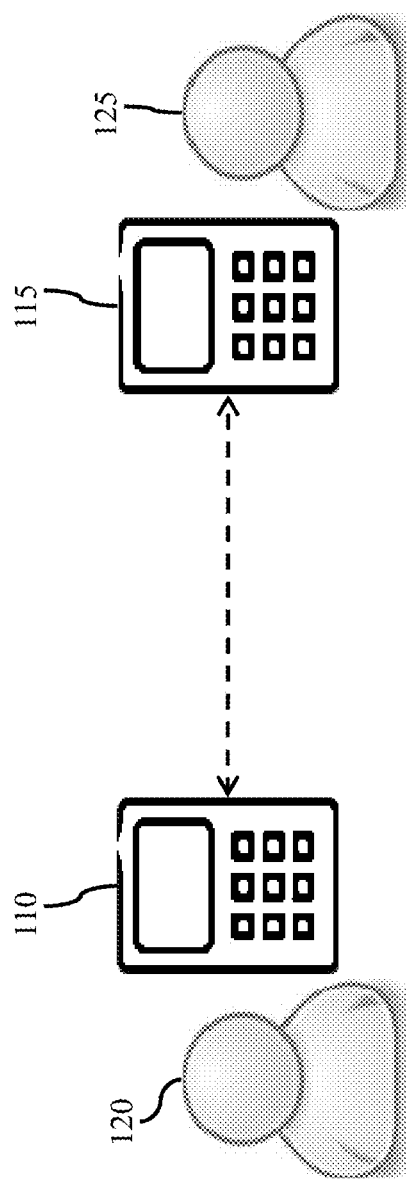
FIG. 1 illustrates a system for transferring data among mobile devices, in accordance with various embodiments of the present invention.

FIG. 1 illustrates a system 100 for transmitting data among mobile device 110 and mobile device 115. The term "mobile device" refers to a portable computing device capable of receiving acoustic input and generating acoustic output. Examples of the mobile device 110 include but may not be limited to, a cell phone, a personal digital assistant (PDA), a wireless email terminal, and a portable point of sale device, a laptop and a tablet computer.

As shown in the FIG. 1, a user 120 uses the mobile device 110 to transfer data to the mobile device 115 of a user 125. Examples of data can include but are not limited to images, audio clips, videos, text messages, documents, files, etc.

In an example, when the user 120 wishes to transfer an image file to the user 125, the user 120 brings the mobile device 110 within proximity of the mobile device 115. Then the user 120 selects the image file in the mobile device 110 and instructs the mobile device 110 to send the image file. Then the mobile device converts the image file to sound and plays the sound. The mobile device 115 intercepts the sound generated by the mobile device 115 and receives the image file.

In another example, the user 120 is a buyer and the user 125 is a merchant. The mobile device 110 is a portable electronic wallet in possession of the buyer. The mobile device 115 is a portable point of sale device of the merchant. The buyer uses the portable electronic wallet to transfer credit and account information to the portable point of sale device for the purpose of paying the merchant and completing a sale.

It is to be noted that a person skilled in the art would be able to implement the system 100 in various other situations and scenarios besides the ones described above.

Figure 2:
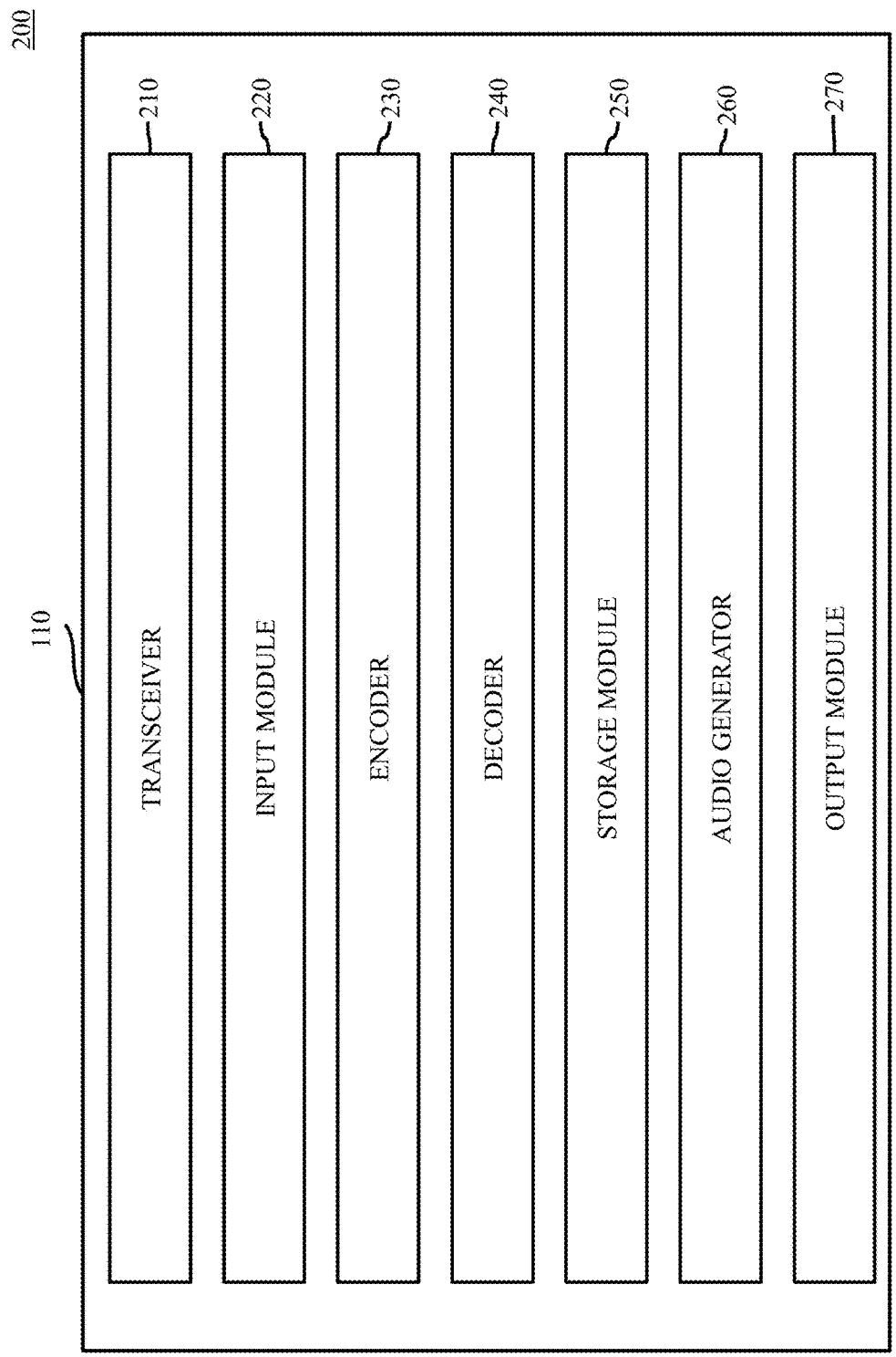
FIG. 2 illustrates a block diagram of a mobile device, in accordance with various embodiments of the present invention.

FIG. 2 illustrates a block diagram 200 of the mobile device 110, in accordance with various embodiments of the present invention. The mobile device 110 includes a transceiver 210, an input module 220, an encoder 230, a decoder, 240, a storage module 250, an audio generator 260 and an output module 270. The transceiver 210 is configured to send and receive electronic signals wirelessly using radio frequencies. The input module 220 includes a microphone (not shown in figure) for receiving acoustic input and converting the acoustic input into one or more audio signals. In an embodiment, the microphone is configured to receive acoustic signals having frequencies between 20 hertz and 22,000 hertz. In an embodiment, the input module 220 includes other input means such as touch pads, keypads, etc., for interacting with the user 120.

The encoder 230 is configured to convert data into one or more frequencies. In an embodiment, the data is alphanumeric data. For example the data is a string of characters: "Flat 906". In an embodiment, the encoder 230 uses a digit encoding scheme to convert the alphanumeric data into numeric data i.e. a string of numbers. Continuing the above mentioned example:

Digit Encoding Scheme ("Flat 906")= "4531344989910132"

The encoder 230 breaks the string of numbers into one or more number frames of numeric data, each frame of a predetermined size. In an embodiment, the predetermined size is less than 6 digits per frame so as to utilize an optimal set of frequencies. In another embodiment, the predetermined size is less than 4 digits per frame. Continuing the above mentioned example, the string of numbers is broken into 4 frames: frame1 4531, frame2 3449, frame3 8991 and frame4 0132. Each frame has 4 digits.

The encoder 230 coverts the one or more frames of numeric data into audio signals on a per frame basis.

Continuing the above mentioned example, the encoder 230 takes the frame1 4531 and converts the frame1 into frequencies. The encoder performs the conversion on a per digit basis. The encoder 230 converts the digits into binary sequences based on a 5 bit encoding scheme. In the encoding scheme digits from 0 to 9 are represented as binary sequences having 2 bits set to 1 and the rest of the bits set to 0. By using a scheme where two bits are always 1, error detection becomes simple and efficient. An example of the 5 bit encoding is given below:

| Digit | Equivalent Binary sequence |
| --- | --- |
| 0 | 11000 |
| 1 | 10100 |
| 2 | 10010 |
| 3 | 10001 |
| 4 | 01100 |
| 5 | 01010 |
| 6 | 01001 |
| 7 | 00110 |
| 8 | 00101 |
| 9 | 00011 |

Continuing the above mentioned example, using the 5 bit encoding scheme shown above, the encoder 230 converts the frame1 4531 into binary sequences: 01100 01010 10001 10100. Similarly, the encoder 230 converts the frame1 3449 into binary sequences: 10001 01100 01100 00011. Using the binary sequences generated, the encoder 230 selects a set of frequencies from a frequency matrix. In an embodiment, frequency matrix is a tabular data structure which has a plurality of frequency values stored in various indices. An example of a frequency matrix is shown below:

| 17077 Hz | 17183 Hz | 17291 Hz | 17393 Hz | 17497 Hz |
| --- | --- | --- | --- | --- |
| 17623 Hz | 17729 Hz | 17837 Hz | 17939 Hz | 18143 Hz |
| 18251 Hz | 18353 Hz | 19121 Hz | 19231 Hz | 19333 Hz |
| 18793 Hz | 18899 Hz | 19661 Hz | 19763 Hz | 19867 Hz |

In an embodiment, the encoder 230 selects frequencies in the frequency matrix which correspond to the position of the bits having value 1 in the binary sequences. Continuing the abovementioned example, using the binary sequence from frame1, the encoder 230 selects a set of frequencies: 17183 Hz, 17291 Hz (the second and third frequencies in the first row as the first binary sequence is 01100); 17729 Hz, 17939 Hz (the second and fourth frequencies in the second row as the second binary sequence is 01010); 18257 Hz, 19333 Hz (the first and fifth frequencies in the third row as the third binary sequence is 10001); 19763 Hz, 19867 Hz (the fourth and fifth frequencies in the fourth row as the fourth binary sequence is 00011).

The encoder 230 prepends or inserts at the beginning a starter frequency to the set of selected frequencies. The starter frequency indicates the start of a frame or a series of frames. The starter frequency is selected from a list of predefined frequency values which do not have significant peak values on applying Fourier transform, thereby ensuring that identification of starter frequencies are performed easily while decoding. Continuing the abovementioned example, the encoder 230 will add a starter frequency 17077 Hz to the selected frequencies.

The audio generator 260 receives the one or more sets of frequencies from the encoder 230 and generates one or more audio signals. In an embodiment, the audio generator 260 generates sine wave samples of 10 ms duration for each frequency in the one or more sets of frequency. The audio generator 260 combines all the audio signals together to generate an output signal. Continuing the above mentioned example, the audio generator 260 will generate nine audio signals for the starter frequency and the selected frequencies. In an embodiment, the audio generator 260 generates sine wave samples of 10 ms duration of the starter frequency. Then, the audio generator 260 generates sine wave samples of 100 ms duration for each frequency in the selected frequencies excluding the starter frequency. The audio generator mashes the all the sine wave samples to generate a combined sound signal, containing the selected frequencies in spectrum.

The output module 270 includes one or more electro acoustic transducers. The electro acoustic transducers receive the output signal (i.e. the one or more audio signals) from the audio generator 260 and convert them into acoustic output. By doing so, the mobile device 110 transmits data using sound waves.

The decoder 240 receives input from microphone continuously. In an embodiment, the decoder 240 monitors the input by taking small sampling windows of 10 ms for the starter frequency. On finding a starter frequency, the decoder 240 starts to generate frame samples of 100 ms till the decoder generates frames up to the number of predefined frames per digit. On failing to receive any two digits in any of the frames, the decoder 240 analyses the input again for the missing digit. The transmitting device will keep on transmitting the same packet till receiving mobile device indicates a complete reception of the transferred data.

The decoder 240 applies hamming window on the frame samples to create wave samples. Then, the decoder 240 applies a Fast Fourier Transform (FFT) on the windowed wave samples to generate a frequencies spectrum. The decoder 240 detects the peaks in the frequencies spectrum and extracts peaks values as selected frequencies. The decoder 240 removes the starter frequency from the selected frequencies. Then, the decoder 240 generates one or more binary sequences from the selected frequencies using the frequency matrix. For example, on receiving a set of frequencies: 17183, 17291, 17729, 17939, 18257, 19333, 19763, 19867, the decoder looks at the location of the frequencies in the frequency matrix to generate the binary sequences. Since two frequencies represent a single digit, the decoder 240 considers pairs of frequencies to decode the digits. For example 17183, 17291=>01100, as 17183 is present in $2^{nd}$ position and 17291 is present in $3^{rd}$ position. Similarly 17729, 17939=>01010
18257, 19333=>10001
19763, 19867=>10100

The decoder 240 utilizes the binary sequences to generate the string of numbers using a binary decoding scheme. The decoder converts 240 the string of numbers into the alpha-numeric data. The storage module 250 stores the frequency matrix.

It should be noted that while the mobile device 120 encodes using a single starter frequency, a set of starter frequencies can be combined together and used by the mobile device 120 to indicate the start of a packet.

Figure 3:
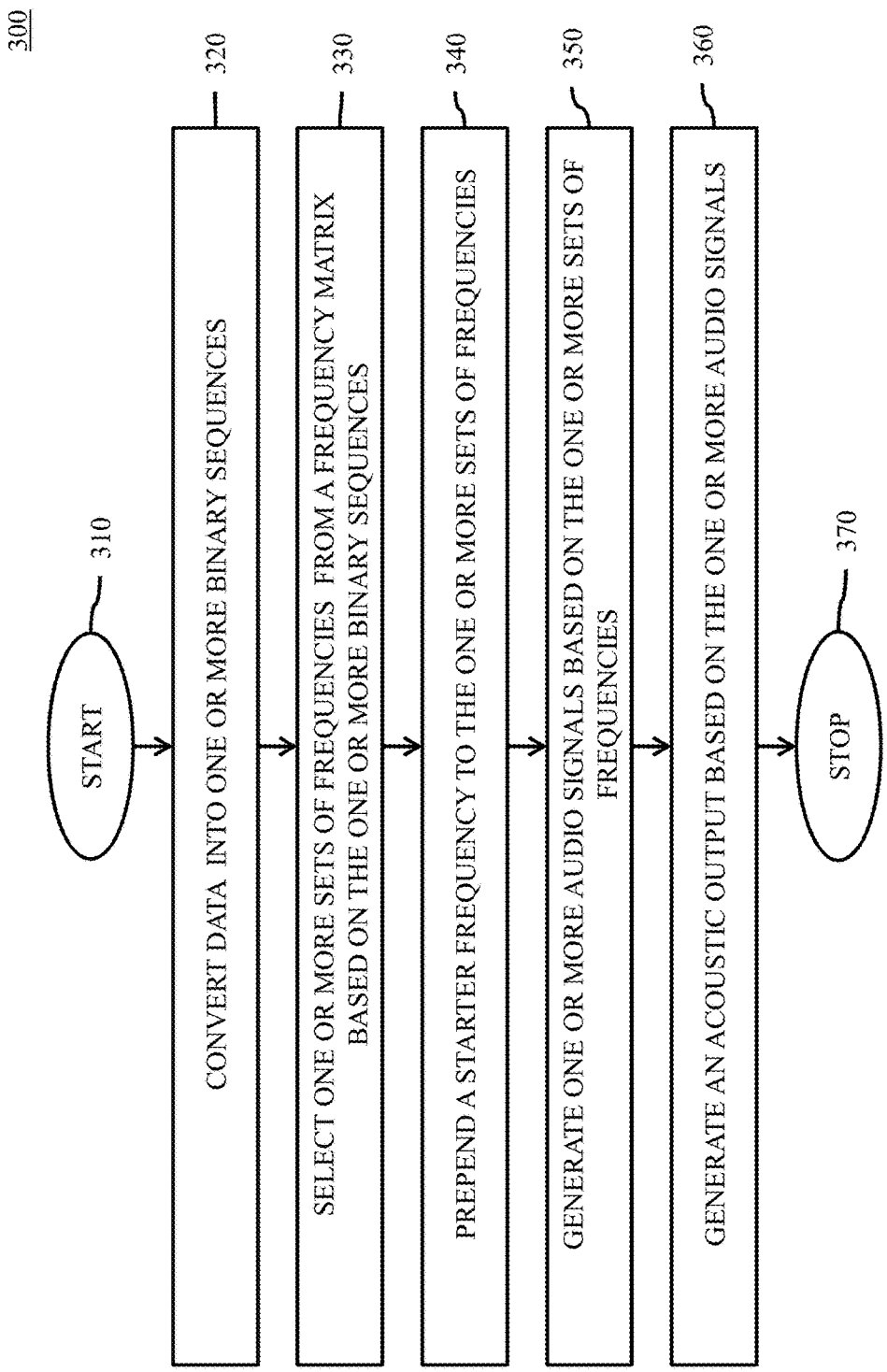
FIG. 3 illustrates flowchart for transmitting data from a mobile device, in accordance with various embodiments of the present invention.

FIG. 3 illustrates flowchart 300 for transmitting data from a mobile device, in accordance with various embodiments of the present invention. At step 310, the flowchart 300 initiates. At step 320, as explained above, the encoder 230 converts data into one or more binary sequences. At step 330, as explained above, the encoder 230 selects one or more sets of frequencies from the frequency matrix. At step 340, as explained above, the encoder 230 prepends the starter frequency to the one or more sets of frequencies. At step 350, the audio generator 260 generates one or more audio signals based on the one or more sets of frequencies. At step 360, the output module 270 generates an acoustic output.

FIG. 4 illustrates flowchart 400 for receiving data by a mobile device, in accordance with various embodiments of the present invention. At step 410, the flowchart 400 initiates. At step 420, as explained above, the input module 220 receives acoustic input. At step 430, as explained above, the input module 220 generates one or more audio signals from the acoustic input. At step 440, as explained above, the decoder 240 extracts one or more frequencies from the audio signals using a Fast Fourier Transform. At step 450, the decoder 240 removes the starter frequency from the selected frequencies. At step 460, the decoder 240 generates one or more binary sequences from the selected frequencies. At step 470, the decoder generates 240 a string of numbers from the one or more binary sequences. At step 480, the flowchart 400 terminates.

As will be appreciated by one skilled in the art, aspects of the present invention can take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention can take the form of a computer program product embodied in one or more computer readable medium(s) having computer readable program code embodied thereon.

Any combination of one or more computer readable medium(s) can be utilized. The computer readable medium can be a computer readable storage medium. Computer program code for carrying out operations for aspects of the present invention can be written in any combination of one or more programming languages, including an object oriented programming language and conventional procedural programming languages.

This written description uses examples to describe the subject matter herein, including the best mode, and also to enable any person skilled in the art to make and use the subject matter. The patentable scope of the subject matter is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A system for transmitting data between a transmitting device and a receiving device, the data being transmitted in a form of an acoustic signal, the transmitting device comprising:
   an encoder configured for:
      converting an alpha-numeric data into
         a numeric data comprising a plurality of digits;
      breaking the numeric data into one or more frames, wherein each frame comprises a pre-defined number of digits;
      converting each digit of each frames into a five-bit binary sequence, wherein each five-bit binary sequence comprises two bits having values of one; and
      selecting a frequency from a frequency matrix, stored in a storage module, for each bit having the value of one for each five-bit binary sequence, based on the location of each bit having the value of one within the five-bit binary sequence;

an audio generator configured for generating an audio signal for each selected frequency; and an output module comprising electro acoustic transducers for generating and transmitting the acoustic signal based on the generated audio signal.

2. The system of claim 1, wherein each selected frequency is under 22 kilohertz.

3. The system of claim 1, wherein the receiving device comprises:

a microphone for receiving the acoustic signal;

a frequency extractor for extracting each of the frequencies from the acoustic signal using a Fast Fourier Transform technique; and a decoder comprising a frequency matrix stored in a storage module, the decoder configured for:

generating each of the five-bit binary sequences by mapping the extracted frequencies with the frequency matrix, wherein each mapped frequency corresponds to a bit having the value of one and each frequency in the frequency matric which does not map to an extracted frequency corresponds to a bit having a value of zero;

generating each digit of each frame from the five-bit binary sequences based on a five-bit binary decoding scheme, wherein each frame comprises the pre-defined number of digits of the numeric data; and generating the alphanumeric data from the frames of the numeric data.

4. A method of transmitting data as an acoustic signal, the method comprising:

converting an alpha-numeric data into a numeric data comprising a plurality of digits;

breaking the numeric data into one or more frames, wherein each frame comprises a pre-defined number of digits;

converting each digit of each frame into a five-bit binary sequence, wherein each five-bit binary sequence comprises two bits having values of one;

selecting a frequency from a frequency matrix, stored in a storage module, for each bit having the value of one for each of the five-bit binary sequence, based on the location of each bit having the value of one within the five-bit binary sequence;

generating audio signals for each selected frequency; and generating and transmitting the acoustic signal based on the generated audio signal.

5. A method for decoding an alpha-numeric data from an acoustic signal, wherein the method comprises:

extracting one or more frequencies from the received acoustic signal using a Fast Fourier Transform technique;

generating one or more five-bit binary sequence by mapping the extracted frequencies with a frequency matrix, wherein each mapped frequency corresponds to a bit of the five-bit binary sequence having a value of one, wherein each five-bit binary sequence comprises two bits having a value of one;

generating one or more digits from each of the one or more five-bit binary sequences;

grouping the one or more digits into one or more frames; wherein each of the one or more frames comprises a pre-defined number of digits of numeric data; and generating the alphanumeric data from frames of numeric data.

* * * * *